United States Patent
Liu et al.

(10) Patent No.: US 10,785,586 B2
(45) Date of Patent: Sep. 22, 2020

(54) SOUND-ABSORBING MATERIAL, SOUND-ABSORBING PARTICLE AND SPEAKER MODULE MANUFACTURING PROCESS, PARTICLE AND MODULE

(71) Applicant: GOERTEK INC., WeiFang, Shandong (CN)

(72) Inventors: Jinli Liu, Shandong (CN); Xiaodong Cao, Shandong (CN)

(73) Assignee: GOERTEK INC., Weifang, Shandong (CN)

( * ) Notice: Subject to any disclaimer, the term of this patent is extended or adjusted under 35 U.S.C. 154(b) by 193 days.

(21) Appl. No.: 15/574,088

(22) PCT Filed: Jul. 11, 2016

(86) PCT No.: PCT/CN2016/089623
§ 371 (c)(1),
(2) Date: Nov. 14, 2017

(87) PCT Pub. No.: WO2017/005222
PCT Pub. Date: Jan. 12, 2017

(65) Prior Publication Data
US 2018/0302731 A1    Oct. 18, 2018

(30) Foreign Application Priority Data
Jul. 3, 2015    (CN) .......................... 2015 1 0387984

(51) Int. Cl.
*H04R 31/00*    (2006.01)
*C01B 32/384*    (2017.01)
(Continued)

(52) U.S. Cl.
CPC ........... *H04R 31/00* (2013.01); *C01B 32/382* (2017.08); *C01B 32/384* (2017.08);
(Continued)

(58) Field of Classification Search
CPC ..... C04B 38/009; C04B 38/02; C04B 38/065; C04B 38/068; E01F 8/00; E01F 8/0082;
(Continued)

(56) References Cited

U.S. PATENT DOCUMENTS 5,895,895 A * 4/1999 Ono ..................... G06F 3/03545
178/19.01
8,455,393 B2 * 6/2013 Choi ..................... C01B 32/182
502/416
(Continued)

FOREIGN PATENT DOCUMENTS

| CN | 1472725 A | 2/2004 |
|---|---|---|
| CN | 101273661 A | 9/2008 |

(Continued)

OTHER PUBLICATIONS

Office Action from Chinese Patent Office for CN 201510387984.8 (Priority Application), dated Oct. 10, 2017.
(Continued)

*Primary Examiner* — Carl J Arbes
(74) *Attorney, Agent, or Firm* — Patshegen IP LLC; Moshe Pinchas

(57) ABSTRACT

The present invention relates to the technical field of electroacoustic products, and discloses sound-absorbing material, sound-absorbing particle, speaker module manufacturing processes, a particle and a module. The process comprises the following steps: placing a raw powder of a porous sound-absorbing material into a heating furnace to perform calcination, and introducing a processing gas during the calcination, wherein the calcination temperature is 120° C. to 800° C., and the calcination time is 6 h to 72 h.

7 Claims, 1 Drawing Sheet

(51) Int. Cl.
  *C01B 32/354* (2017.01)
  *C01B 39/02* (2006.01)
  *G10K 11/162* (2006.01)
  *H04R 1/28* (2006.01)
(52) U.S. Cl.
  CPC .......... *C01B 39/026* (2013.01); *G10K 11/162* (2013.01); *H04R 1/2803* (2013.01)
(58) Field of Classification Search
  CPC ....... E04B 1/88; C01B 32/382; C01B 32/384; C01B 39/026; G10K 11/162; H04R 1/2803; H04R 31/00
  See application file for complete search history.

(56) References Cited

U.S. PATENT DOCUMENTS

| | | | |
|---|---|---|---|
| 9,794,659 B2 * | 10/2017 | Papakyriacou | B01J 20/18 |
| 2007/0135637 A1 * | 6/2007 | Bosch | B01J 29/40 |
| | | | 544/352 |

FOREIGN PATENT DOCUMENTS

| | | | |
|---|---|---|---|
| CN | 102321307 A | | 1/2012 |
| CN | 102527443 B | * | 4/2013 |
| CN | 103100418 A | | 5/2013 |
| CN | 103159578 A | | 6/2013 |
| CN | 103288478 A | * | 9/2013 |
| CN | 103556723 A | * | 2/2014 |
| CN | 103722749 A | | 4/2014 |
| CN | 104202703 A | | 12/2014 |
| CN | 104994461 A | | 10/2015 |
| EP | 2424270 A1 | | 2/2012 |
| JP | 02-043688 B | * | 10/1990 |

OTHER PUBLICATIONS

International Search Report of the PCT (ISA/CN) dated Sep. 30, 2016 (translation submitted).

* cited by examiner

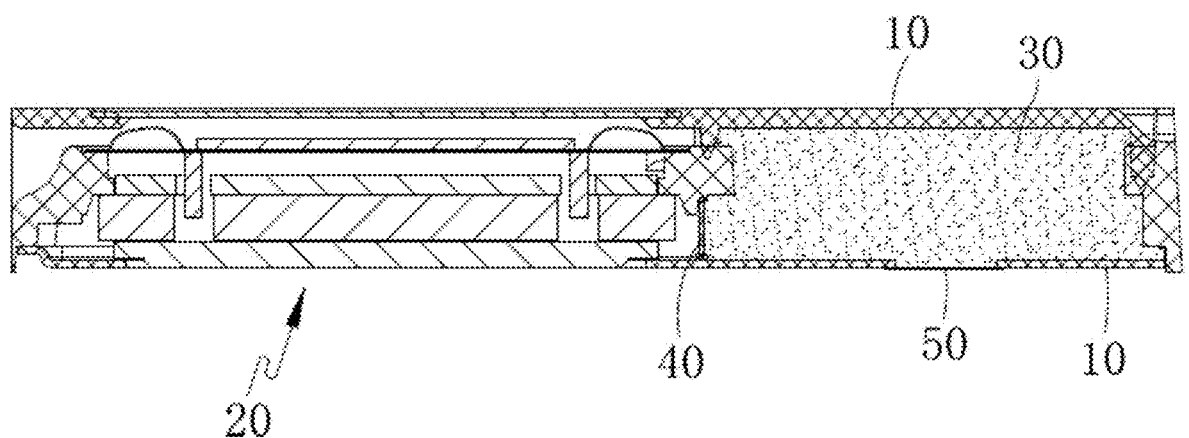

SOUND-ABSORBING MATERIAL, SOUND-ABSORBING PARTICLE AND SPEAKER MODULE MANUFACTURING PROCESS, PARTICLE AND MODULE

TECHNICAL FIELD

The present disclosure relates to the technical field of electroacoustic products, and more particularly, to a process for passivation treating a porous sound-absorbing material, a process for treating a sound-absorbing particle, the sound-absorbing particle manufactured using the treating process, a process for packaging a speaker module provided with the sound-absorbing particle, and the speaker module manufactured using the packaging process.

BACKGROUND ART

As an important acoustic component of portable electronic devices, a speaker module is used for accomplishing the conversion between an electrical signal and an acoustic signal, and thus serves as an energy conversion device. An existing speaker module generally includes a housing, in which a speaker unit is accommodated. An inner cavity of the whole module is separated, by the speaker unit, into a front acoustic cavity and a rear acoustic cavity. Along with the continuous miniaturization of the speaker module, the volume of the rear acoustic cavity is further compressed. To ensure that F0 (resonant frequency) of the speaker module is low enough and to guarantee the low and medium frequency sound quality of the speaker module, those skilled in the art may fill a porous material into the rear acoustic cavity. Using the quick adsorption-desorption property of the porous material to gas in the rear acoustic cavity, a resonant space can be virtually increased, and thus the low and medium resonant frequency F0 of the module is reduced more effectively.

To implement the quick adsorption-desorption property of the porous material matching the resonant frequency of the speaker module, it is required that micropore dimension, pore diameter distribution and channel structure above level II of the porous material (such as activated carbon, natural zeolite powder or a mixture prepared according to particular types and proportions) match sizes and types of gas molecules. However, if the environment of the porous material contains heterogeneous molecules (solvents such as ethanol, or aromatic small molecular volatile matters, and so on), the heterogeneous molecules do not match the micropore dimension and the channel structure of the porous material, or chemical adsorption exists between the heterogeneous molecules and the porous material, thus the heterogeneous molecules cannot be desorbed quickly, so that the channel structure is blocked and the quick adsorption-desorption effect on the gas is attenuated or disabled. Thus, the effect of reducing the F0 of the speaker module is weakened or disabled, and product performance improvement of the porous material goes beyond a preset expectation. Nevertheless, in the production and assembly process of the speaker module, it is inevitable to generate the heterogeneous molecules, for example, volatilized organic solvents in a glue curing process, small-molecule organics generated in glue polycondensation and curing processes, various auxiliaries contained in the glue which are constantly volatilized as the curing degree increases or in the aging process, and small-molecule organics generated by fission of an injection molding materials of the module in the aging process, etc. The presence of the above cases causes unstable effect of improving the acoustic performance by the sound-absorbing material in the speaker module filled with the porous sound-absorbing material and poor product reliability, and thus hinders the application of the porous sound-absorbing material in the field of the speaker module.

SUMMARY

In view of the above defects, a first technical problem to be solved by the present disclosure is to provide a process for treating a porous sound-absorbing material, which can repair defects of oxygen atoms in a molecular sieve lattice, perfect channels and channel structures of the porous material, reduce the material surface activity, and reduce chemical adsorption of the porous sound-absorbing material to small molecules of gas.

Based on the same inventive concept, a second technical problem to be solved by the present disclosure is to provide a process for treating a sound-absorbing particle. The sound-absorbing particle manufactured by this treating process is poor in chemical adsorption to small molecules of gas, high in stability, and good in effect of improving F0 of the speaker module.

Based on the same inventive concept, a third technical problem to be solved by the present disclosure is to provide a sound-absorbing particle. The sound-absorbing particle is poor in chemical adsorption to small molecules of gas, high in stability, and good in effect of improving F0 of the speaker module.

Based on the same inventive concept, a fourth technical problem to be solved by the present disclosure is to provide a process for packaging a speaker module. A speaker module manufactured by this packaging process is high in reliability, and good in low and medium frequency performance.

Based on the same inventive concept, a fifth technical problem to be solved by the present disclosure is to provide a process for packaging a speaker module. A speaker module manufactured by this packaging process is high in reliability, and good in low and medium frequency performance.

Based on the same inventive concept, a sixth technical problem to be solved by the present disclosure is to provide a speaker module. The speaker module is high in reliability, and good in low and medium frequency performance.

To solve the first technical problem, the present disclosure adopts following technical solutions.

A process for treating a sound-absorbing material comprises following steps: placing a raw powder of a porous sound-absorbing material into a heating furnace for performing calcination to the raw power, and introducing a processing gas during the calcination, wherein a calcination temperature is 120° C. to 800° C., and a calcination time is 6 h to 72 h.

As an embodiment, the porous sound-absorbing material is zeolite, the calcination temperature is 120° C. to 400° C., and the calcination time is 6 h to 72 h.

Wherein, the calcination temperature is 300° C., and the calcination time is 24 h.

Wherein, the processing gas is high purity oxygen.

As another embodiment, the porous sound-absorbing material is activated carbon, the calcination temperature is 200° C. to 800° C., and the calcination time is 12 h to 72 h.

Wherein, the processing gas is high purity nitrogen.

To solve the second technical problem, the present disclosure adopts following technical solutions.

A process for treating a sound-absorbing particle comprises following steps: S1: providing a raw powder of a porous sound-absorbing material; S2: performing passivation treatment on the raw powder of the porous sound-absorbing material using the above process for treating the sound-absorbing material; and S3: granulating the raw powder of the porous sound-absorbing material processed in the Step S2 to form the granulated sound-absorbing material.

Wherein the process for treating the sound-absorbing particle further comprises Step S4: performing baking treatment on the granulated sound-absorbing material prepared in the Step S3, and meanwhile purging the granulated sound-absorbing material with air or inert gas, wherein a treatment temperature is 30° C. to 300° C., and a treatment time is 0.5 h to 72 h.

To solve the third technical problem, the present disclosure adopts a technical solution as below.

Provided is a sound-absorbing particle, which is prepared by the above process for treating the sound-absorbing particle.

To solve the fourth technical problem, the present disclosure adopts following technical solutions.

A process for packaging a speaker module comprises following steps: SA: fixing a speaker unit into a housing of the speaker module so that an inner cavity of the speaker module is separated, by the speaker unit, into a front acoustic cavity and a rear acoustic cavity; and providing a sound-absorbing particle to be filled into the rear acoustic cavity, wherein the sound-absorbing particle is the above sound-absorbing particle; SB: performing baking treatment on the sound-absorbing particle and the speaker module semi-finished product assembled in the Step S1, and meanwhile purging the speaker module semi-finished product and the sound-absorbing particle with air or inert gas, wherein a baking temperature is 30° C. to 300° C., and a treatment time is 0.5 h to 72 h; and SC: filling the baked sound-absorbing particle into the rear acoustic cavity of the speaker module semi-finished product, and sealing the rear acoustic cavity, thereby finishing a packaging procedure of the speaker module.

To solve the fifth technical problem, the present disclosure adopts following technical solutions.

A process for packaging a speaker module comprises following steps: Sa: fixing a speaker unit into a housing of the speaker module so that an inner cavity of the speaker module is separated, by the speaker unit, into a front acoustic cavity and a rear acoustic cavity; and providing a sound-absorbing particle to be filled into the rear acoustic cavity, wherein the sound-absorbing particle is the above sound-absorbing particle; Sb: performing baking treatment on the speaker module semi-finished product assembled in the Step Sa, and meanwhile purging the speaker module semi-finished product with air or inert gas, wherein a baking temperature is 30° C. to 300° C., and a treatment time is 0.5 h to 72 h; and Sc: filling the sound-absorbing particle into the rear acoustic cavity of the baked speaker module semi-finished product, and sealing the rear acoustic cavity, thereby finishing a packaging procedure of the speaker module.

To solve the sixth technical problem, the present disclosure adopts a technical solution as below.

Provided is a speaker module, which is packaged by the process for packaging a speaker module.

After the above technical solutions are adopted, the present disclosure has the following beneficial effects.

According to the process for treating a sound-absorbing material of the present disclosure, a raw powder of a porous sound-absorbing material is placed into a heating furnace to perform calcination to the raw power, and oxygen is introduced during the calcination, wherein a calcination temperature is 120° C. to 800° C., and a calcination time is 6 h to 72 h. After the above passivation treatment, defects of oxygen atoms in a molecular sieve lattice may be repaired, channels and channel structures of the porous material may be perfected, the material surface activity may be reduced, and chemical adsorption of small organic molecules of gas may be decreased. To verify the influence of the passivation treatment on the effect of reducing the F0 of the speaker module by particles, the following contrast experiments are made.

Raw powder of the same batch of the sound-absorbing material is selected. A No. 1 raw powder is not processed, a No. 2 raw powder is subjected to the passivation treatment, and the No. 1 raw powder and the No. 2 raw powder are respectively made into a No. 1 particle and a No. 2 particle available for the speaker module product using the same granulating process.

Experiment I: the No. 1 particle and the No. 2 particle are respectively filled into the speaker module product as shown in FIG. 1, each being filled with ten units; and data on reducing the F0 are obtained for the two types of particles by means of acoustic test as below:

The F0 is reduced by 120 Hz by the No. 1 particle on average, and the F0 is reduced by 123 Hz by the No. 2 particle on average.

Experiment II: a reliability test-service life at high temperature (which refers to an experiment to test the product reliability when the module continuously works at a relatively high temperature of 50° C.) is performed on the two types of products. The reason why the sound-absorbing particle loses efficacy is because the module may volatilize more heterogeneous molecules in a high-temperature environment, and it is easier for the porous material to absorb the heterogeneous molecules in the high temperature environment. Furthermore, the module works continuously and the gas in contact with the sound-absorbing particles vibrates constantly, which accelerates the absorption of the heterogeneous molecules. Specific test requirements are the same as that in the Experiment I. The F0 is increased by 40 Hz by the No. 1 particle, and the F0 is increased by 25 Hz by the No. 2 particle.

From the above two test results, it may be concluded that the improvement of the sound-absorbing material after the passivation treatment to the F0 of the speaker module is enhanced, and the reliability of the sound-absorbing particles may be better improved.

The process for treating a sound-absorbing particle of the present disclosure comprises following steps: S1: providing a raw powder of a porous sound-absorbing material; S2: performing passivation treatment on the raw powder of the porous sound-absorbing material using the process for treating the sound-absorbing material; and S3: granulating the raw powder of the processed sound-absorbing material to form the granulated sound-absorbing material. The raw powder of the sound-absorbing material subjected to the passivation treatment effectively reduces the chemical adsorption of the prepared sound-absorbing particle to the small organic molecules of the gas, and guarantees the channels to be unblocked. Thus, the quick adsorption-desorption effect to the gas is improved, the effect of improving the F0 of the speaker module is enhanced, and the reliability of the quick adsorption-desorption effect to the gas is improved significantly.

The process for packaging a speaker module of the present disclosure comprises the following steps: performing baking treatment on the speaker module semi-finished product and the sound-absorbing particle, and meanwhile purging the speaker module semi-finished product and the sound-absorbing particle with air or inert gas, wherein the baking temperature is 30° C. to 300° C., and the treatment time is 0.5 h to 72 h; and SC: filling the baked sound-absorbing particle into the rear acoustic cavity of the speaker module semi-finished product, and sealing the rear acoustic cavity. By baking, the heterogeneous molecules remained in the sound-absorbing particle and the speaker module are volatilized quickly. By purging with the air or the inert gas, the heterogeneous molecules can be brought out of the cavity of the module. Therefore, the concentration of the heterogeneous molecules remained in the sound-absorbing particle and the cavity of the module is effectively reduced, the degree of losing efficacy of the sound-absorbing particle in the speaker module is reduced, and the reliability of the speaker module is improved. To verify the effect of the baking and purging treatments on the reliability of the speaker module, the following contrast experiments are made.

Each ten units of samples of the speaker module as shown in FIG. 1 in the same batch are selected and respectively numbered as No. 1 samples and No. 2 samples. The baking and purging treatments are not performed on the No. 1 samples, whereas the baking and purging treatments are performed on the No. 2 samples. Both the No. 1 samples and the No. 2 samples are subject to the reliability test-service life at high temperature. The test conditions are the same as follows: energized at 50° C. and continuously working for 24 h.

1) Testing the F0 of the No. 1 samples shows that the F0 after the test rises by about 40 Hz on average.

2) Testing the F0 of the No. 2 samples shows that the F0 after the test rises by about 10 Hz on average.

From the above test results, it may be concluded that the reliability of the product can be obviously improved after the baking and purging treatments.

To sum up, the process for manufacturing a sound-absorbing material, a sound-absorbing particle and a speaker module as well as the particle and the module according to the present disclosure solve the technical problems that the sound-absorbing particle in the prior art are prone to lose efficacy, reduces the surface activity of the sound-absorbing material and the chemical adsorption thereof to the small organic molecules of gas, thus better improving the F0 of the speaker module, and obviously enhancing the reliability of the speaker module.

BRIEF DESCRIPTION OF THE DRAWINGS

FIG. 1 is a schematic structural diagram of a speaker module according to the present disclosure.

In the FIGURE, 10: housing of module; 20: speaker unit; 30: sound-absorbing particle; 40: separator; 50: seal element.

DETAILED DESCRIPTION OF EMBODIMENTS

The present disclosure is further described in the following with reference to the accompanying drawings and embodiments.

A process for treating a sound-absorbing material comprises following steps: placing a raw powder of a porous sound-absorbing material into a heating furnace for performing calcination to the raw power, and introducing a processing gas during the calcination, wherein a calcination temperature is 120° C. to 800° C., and a calcination time is 6 h to 72 h.

Embodiment I

The porous sound-absorbing material is natural zeolite. Raw powder of the natural zeolite is placed into a muffle furnace to perform calcination to the raw power, and high purity oxygen is introduced during the calcination, wherein a calcination temperature is 120° C. to 350° C., and a calcination time is 6 h to 72 h.

Embodiment II

This embodiment is basically identical to Embodiment I, and a difference resides in that: the calcination temperature is 120° C., and the calcination time is 72 h.

Embodiment III

This embodiment is basically identical to Embodiment I, and the difference resides in that: the calcination temperature is 300° C., and the calcination time is 24 h.

Embodiment IV

This embodiment is basically identical to Embodiment I, and the difference resides in that: the calcination temperature is 350° C., and the calcination time is 6 h.

Embodiment V

The porous sound-absorbing material is artificial zeolite. Raw powder of the artificial zeolite is placed into the muffle furnace to perform calcination to the raw power, and the high purity oxygen is introduced during the calcination, wherein a calcination temperature is 150° C. to 400° C., and a calcination time is 6 h to 72 h.

Embodiment VI

This embodiment is basically identical to Embodiment V, and the difference resides in that:

the calcination temperature is 150° C., and the calcination time is 72 h.

Embodiment VII

This embodiment is basically identical to Embodiment V, and the difference resides in that:

the calcination temperature is 300° C., and the calcination time is 24 h.

Embodiment VIII

This embodiment is basically identical to Embodiment V, and the difference resides in that:

the calcination temperature is 400° C., and the calcination time is 6 h.

Embodiment IX

The porous sound-absorbing material is activated carbon. Raw powder of the activated carbon is placed into the muffle furnace to perform calcination to the raw power, and high purity nitrogen is introduced during the calcination, wherein a calcination temperature is 200° C. to 800° C., and a calcination time is 12 h to 72 h.

Embodiment X

This embodiment is basically identical to Embodiment IX, and the difference resides in that:

the calcination temperature is 200° C., and the calcination time is 72 h.

Embodiment XI

This embodiment is basically identical to Embodiment IX, and the difference resides in that:

the calcination temperature is 500° C., and the calcination time is 36 h.

Embodiment XII

This embodiment is basically identical to Embodiment IX, and the difference resides in that:

the calcination temperature is 800° C., and the calcination time is 12 h.

After performing passivation treatment on the raw powder of the porous sound-absorbing material in the above embodiments, defects of oxygen atoms in a molecular sieve lattice are repaired, channels and channel structures of the porous material are perfected, the material surface activity is reduced, chemical adsorption of small organic molecules of gas is reduced, and thus the effect of improving the F0 of the speaker module is enhanced.

Embodiment XIII

A process for treating a sound-absorbing particle comprises following steps:

S1: providing raw powder of a porous sound-absorbing material;

S2: performing passivation treatment on the raw powder of the sound-absorbing material using the corresponding process for treating the sound-absorbing material according to Embodiment I to Embodiment XII based on different types of the sound-absorbing materials; and S3: granulating the raw powder of the sound-absorbing material processed in the Step S2 to form the granulated sound-absorbing material, namely, a sound-absorbing particle.

Embodiment XIV

This embodiment is basically identical to Embodiment XIII, and the difference resides in:

further comprising Step S4: performing baking treatment on the granulated sound-absorbing material prepared in the Step S3, and meanwhile purging the granulated sound-absorbing material with air or inert gas, wherein a treatment temperature is 30° C. to 300° C., and a treatment time is 0.5 h to 72 h.

Embodiment XV

This embodiment is basically identical to Embodiment XIV, and the difference resides in that:

the treatment temperature is 30° C., and the treatment time is 72 h.

Embodiment XVI

This embodiment is basically identical to Embodiment XIV, and the difference resides in that:

the treatment temperature is 100° C., and the treatment time is 24 h.

Embodiment XVII

This embodiment is basically identical to Embodiment XIV, and the difference resides in that:

the treatment temperature is 300° C., and the treatment time is 0.5 h.

Embodiment XVIII

There is provided a sound-absorbing particle, a raw material thereof is the raw powder of the natural zeolite, the raw powder of the artificial zeolite or the raw powder of the activated carbon. The sound-absorbing particle is processed into a spherical or nearly spherical particle using the process for treating a sound-absorbing particle according to Embodiment XIII to Embodiment XVII. The spherical or nearly spherical particle is the sound-absorbing particle.

The sound-absorbing particle is poor in chemical adsorption of small organic molecules of gas, and an unobstructed channel thereof is strong in quick adsorption-desorption and high in reliability, which may enhance the effect of improving the F0 of the speaker module, and greatly enhance the reliability of the speaker module.

Embodiment XIX

A process for packaging a speaker module comprises following steps:

SA: fixing a speaker unit into a housing of the speaker module, so that an inner cavity of the speaker module is separated, by the speaker unit, into a front acoustic cavity and a rear acoustic cavity; and providing a sound-absorbing particle to be filled into the rear acoustic cavity, wherein the sound-absorbing particle is the sound-absorbing particle prepared using the process for treating a sound-absorbing particle according to Embodiment XIII;

SB: performing baking treatment on the sound-absorbing particle and the speaker module semi-finished product assembled in the Step SA, and meanwhile purging the speaker module semi-finished product and the sound-absorbing particle with air or inert gas, wherein a baking temperature is 30° C. to 300° C., and a treatment time is 0.5 h to 72 h; and SC: filling the baked sound-absorbing particle into the rear acoustic cavity of the speaker module semi-finished product, and sealing the rear acoustic cavity, thereby finishing a packaging procedure of the speaker module.

Embodiment XX

This embodiment is basically identical to Embodiment XIX, and the difference resides in that:

the treatment temperature is 30° C., and the treatment time is 72 h.

Embodiment XXI

This embodiment is basically identical to Embodiment XIX, and the difference resides in that:
the treatment temperature is 100° C., and the treatment time is 24 h.

Embodiment XXII

This embodiment is basically identical to Embodiment XIX, and the difference resides in that:
the treatment temperature is 300° C., and the treatment time is 0.5 h.

Embodiment XXIII

A process for packaging a speaker module comprises following steps:
Sa: fixing a speaker unit into a housing of the speaker module so that an inner cavity of the speaker module is separated, by the speaker unit, into a front acoustic cavity and a rear acoustic cavity; and providing a sound-absorbing particle to be filled into the rear acoustic cavity, wherein the sound-absorbing particle is the sound-absorbing particle prepared using the process for treating a sound-absorbing particle according to Embodiment XIV to Embodiment XVII;
Sb: performing baking treatment on the speaker module semi-finished product assembled in the Step Sa, and meanwhile purging the speaker module semi-finished product with air or inert gas, wherein a baking temperature is 30° C. to 300° C., and a treatment time is 0.5 h to 72 h; and
Sc: filling the sound-absorbing particle into the rear acoustic cavity of the baked speaker module semi-finished product, and sealing the rear acoustic cavity, thereby finishing a packaging procedure of the speaker module.

Embodiment XXIV

This embodiment is basically identical to Embodiment XXIII, and the difference resides in that:
the treatment temperature is 30° C., and the treatment time is 72 h.

Embodiment XXV

This embodiment is basically identical to Embodiment XXIII, and the difference resides in that:
the treatment temperature is 100° C., and the treatment time is 24 h.

Embodiment XXVI

This embodiment is basically identical to Embodiment XXIII, and the difference resides in that:
the treatment temperature is 300° C., and the treatment time is 0.5 h.

Embodiment XXVII

As shown in FIG. 1, there is provided a speaker module, which is packaged using the process for packaging a speaker module according to any one of Embodiment XIX to Embodiment XXVI, including a housing 10 of the module. The housing 10 of the module is accommodated therein a speaker unit 20. An inner cavity of the whole module is separated, by the speaker unit 20, into a front acoustic cavity and a rear acoustic cavity. A mesh separator 40 is arranged at a position, in the rear acoustic cavity, close to the speaker unit 20. The rear acoustic cavity is separated, by the separator 40 into a filling area and a non-filling area. The speaker unit is located in the non-filling area. A filling hole is provided on a position, of the housing 10 of the module, corresponding to the filling area. When assembling the module, the sound-absorbing particle 30 is filled into the filling area via the filling hole. A seal element 50 is covered on an outer side of the filling hole after the filling, and the rear acoustic cavity of the module is sealed.

The speaker module is high in reliability, good in low and medium frequency performance, and high in overall acoustic performance.

The present disclosure is not limited to the above specific embodiments, and all transformations made by those of ordinary skill in the art based on the above conception without creative labor fall within the scope of protection of the present disclosure.

The invention claimed is:

1. A process for treating a sound-absorbing particle, comprising following steps:
    S1: providing a raw powder of a porous sound-absorbing material;
    S2: performing passivation treatment on the raw powder of the porous sound-absorbing material using the process for treating the sound-absorbing material, wherein the process for treating the sound-absorbing material comprises following steps:
    placing the raw powder of the porous sound-absorbing material of step S1 into a heating furnace for performing calcination to the raw powder, and introducing a processing gas during the calcination, wherein a calcination temperature is 120° C. to 800° C., and a calcination time is 6 h to 72 h; and
    S3: granulating the raw powder of the porous sound-absorbing material processed in the Step S2 to form the granulated sound-absorbing material.

2. The process for treating the sound-absorbing particle according to claim 1, further comprising following steps:
    S4: performing baking treatment on the granulated sound-absorbing material prepared in the Step S3, and meanwhile purging the granulated sound-absorbing material with air or inert gas, wherein a treatment temperature is 30° C. to 300° C., and a treatment time is 0.5 h to 72 h.

3. The process for treating the sound-absorbing particle according to claim 1, wherein the porous sound-absorbing material is zeolite, the calcination temperature is 120° C. to 400° C., and the calcination time is 6 h to 72 h.

4. The process for treating the sound-absorbing particle according to claim 3, wherein the calcination temperature is 300° C., and the calcination time is 24 h.

5. The process for treating the sound-absorbing particle according to claim 3, wherein the processing gas is high purity oxygen.

6. The process for treating the sound-absorbing particle according to claim 1, wherein the porous sound-absorbing material is activated carbon, the calcination temperature is 200° C. to 800° C., and the calcination time is 12 h to 72 h.

7. The process for treating the sound-absorbing particle according to claim 6, wherein the processing gas is high purity nitrogen.

* * * * *